US012382220B2

(12) United States Patent
Pyatt et al.

(10) Patent No.: US 12,382,220 B2
(45) **Date of Patent: *Aug. 5, 2025**

(54) DYNAMIC CONTROL OF MULTIPLE FEEDFORWARD MICROPHONES IN ACTIVE NOISE REDUCTION DEVICES

(71) Applicant: Bose Corporation, Framingham, MA (US)

(72) Inventors: Richard L. Pyatt, Fitchburg, MA (US); Emery M. Ku, Somerville, MA (US)

(73) Assignee: Bose Corporation, Framingham, MA (US)

( * ) Notice: Subject to any disclaimer, the term of this patent is extended or adjusted under 35 U.S.C. 154(b) by 94 days.

This patent is subject to a terminal disclaimer.

(21) Appl. No.: 17/962,005

(22) Filed: Oct. 7, 2022

(65) Prior Publication Data

US 2023/0026742 A1 Jan. 26, 2023

Related U.S. Application Data

(63) Continuation of application No. 17/129,615, filed on Dec. 21, 2020, now Pat. No. 11,496,832, which is a (Continued)

(51) Int. Cl.
*G10K 11/178* (2006.01)
*G10L 21/0216* (2013.01)
(Continued)

(52) U.S. Cl.
CPC ............ *H04R 3/04* (2013.01); *G10L 21/0216* (2013.01); *H04R 1/10* (2013.01); *H04R 5/027* (2013.01);
(Continued)

(58) Field of Classification Search
CPC . H04R 3/04; H04R 1/10; H04R 5/027; H04R 5/04; H04R 3/005; G10K 11/178; G10K 11/1788; G10K 2210/1081
(Continued)

(56) References Cited

U.S. PATENT DOCUMENTS

| | | | | |
|---|---|---|---|---|
| 8,948,409 B2 * | 2/2015 | Hua | ..................... | H04R 1/1083 381/94.1 |
| 10,755,690 B2 * | 8/2020 | Mohammad | ......... | H04R 1/1083 |

(Continued)

FOREIGN PATENT DOCUMENTS

| | | |
|---|---|---|
| CN | 105247885 B | 8/2018 |
| CN | 107211205 B | 10/2019 |
| CN | 106911992 B | 12/2021 |

OTHER PUBLICATIONS

"The Design and Implementation of Acoustic Feedback Suppression Algorithm Based On Sharc DSP", Sharc DSP, Dec. 2015.

(Continued)

*Primary Examiner* — Disler Paul

(57) ABSTRACT

Technology described in this document can be embodied in an earpiece of an active noise reduction (ANR) device. The earpiece includes a plurality of microphones, wherein each of the plurality of microphones is usable for capturing ambient audio to generate input signals for both an ANR mode of operation and a hear-through mode of operation of the ANR device. The earpiece further includes a controller configured to: process a first subset of microphones from the plurality of microphones to generate input signals for the ANR mode of operation and process a second subset of microphones from the plurality of microphones to generate input signals for the hear-through mode of operation. The second subset of microphones excludes a first microphone from the plurality of microphones located closest to a noise pathway of the earpiece.

17 Claims, 5 Drawing Sheets

Related U.S. Application Data continuation of application No. 16/422,239, filed on May 24, 2019, now Pat. No. 10,873,809.

(51) Int. Cl.

| | |
|---|---|
| ***H04R 1/10*** | (2006.01) |
| ***H04R 3/04*** | (2006.01) |
| ***H04R 5/027*** | (2006.01) |
| ***H04R 5/04*** | (2006.01) |

(52) U.S. Cl.

CPC ............ *H04R 5/04* (2013.01); *G10K 11/178* (2013.01); *G10L 2021/02166* (2013.01); *H04R 2460/01* (2013.01)

(58) Field of Classification Search

USPC .................................. 381/74, 56, 71.1, 71.6

See application file for complete search history.

(56) References Cited

U.S. PATENT DOCUMENTS

| | | | | |
|---|---|---|---|---|
| 2011/0002474 | A1 | 1/2011 | Fuller | |
| 2015/0172815 | A1 | 6/2015 | Park | |
| 2018/0286374 | A1 | 10/2018 | Cattell | |
| 2018/0324514 | A1* | 11/2018 | Dusan | G10K 11/17885 |

OTHER PUBLICATIONS

First Chinese Office Action dated Nov. 23, 2023 for Chinese Patent Application No. 2020800449777.

Liebich S., Brandis R., Fabry J., Jax P., Vary P., "Active Occlusion Cancellation with Hear-Through Equalization for Headphones" Institute of Communication Systems, RWTH Aachen University, 2018.

Xuhua H., Zhaoguo, G., Anc Devic" of Loudspeaker System Simulation", Huadian Heavy Industries Co., td, Beijing 100070 , China, http://www.cnki.net.

* cited by examiner

DYNAMIC CONTROL OF MULTIPLE FEEDFORWARD MICROPHONES IN ACTIVE NOISE REDUCTION DEVICES

CROSS REFERENCE TO RELATED APPLICATIONS

This application is a continuation of U.S. application Ser. No. 17/129,615, filed Dec. 21, 2020, which is a continuation of U.S. application Ser. No. 16/422,239, filed May 24, 2019, now U.S. Pat. No. 10,873,809, the entire contents of which are incorporated herein by reference.

TECHNICAL FIELD

This disclosure generally relates to active noise reduction (ANR) devices that also allow hear-through functionality to reduce isolation effects.

BACKGROUND

Acoustic devices such as headphones can include active noise reduction (ANR) capabilities that block at least portions of ambient noise from reaching the ear of a user. Therefore, ANR devices create an acoustic isolation effect, which isolates the user, at least in part, from the environment. To mitigate the effect of such isolation, some acoustic devices can include an active hear-through mode, in which the noise reduction is adjusted or turned down for a period of time and at least a portion of the ambient sounds are allowed to be passed to the user's ears. Examples of such acoustic devices can be found in U.S. Pat. Nos. 8,155,334 and 8,798,283, the entire contents of which are incorporated herein by reference.

SUMMARY

In general, in one aspect, this document features an earpiece of an active noise reduction (ANR) device. The earpiece includes a plurality of microphones, wherein each of the plurality of microphones is usable for capturing ambient audio to generate input signals for both an ANR mode of operation and a hear-through mode of operation of the ANR device. The earpiece further includes a controller configured to: process a first subset of microphones from the plurality of microphones to generate input signals for the ANR mode of operation, process a second subset of microphones from the plurality of microphones to generate input signals for the hear-through mode of operation, detect that a particular microphone of the second subset is acoustically coupled to an acoustic transducer of the ANR device in the hear-through mode of operation, and in response to the detection, process the input signals from the second subset of microphones without using input signals from the particular microphone.

In another aspect, this document features a computer-implemented method that includes: processing, from a plurality of microphones disposed on an earpiece of an ANR device, a first subset of microphones to generate input signals for an ANR mode of operation; processing a second subset of microphones from the plurality of microphones to generate input signals for a hear-through mode of operation; wherein each of the plurality of microphones is usable for capturing ambient audio to generate input signals for both the ANR mode of operation and the hear-through mode of operation of the ANR device; detecting that a particular microphone of the second subset is acoustically coupled to an acoustic transducer of the ANR device in the hear-through mode of operation; and in response to the detection, processing the input signals from the second subset of microphones without using input signals from the particular microphone.

In another aspect, this document features one or more machine-readable storage devices having encoded thereon computer readable instructions for causing one or more processing devices to perform various operations. The operations comprise: processing, from a plurality of microphones disposed on an earpiece of an ANR device, a first subset of microphones to generate input signals for an ANR mode of operation; processing a second subset of microphones from the plurality of microphones to generate input signals for a hear-through mode of operation; wherein each of the plurality of microphones is usable for capturing ambient audio to generate input signals for both the ANR mode of operation and the hear-through mode of operation of the ANR device; detecting that a particular microphone of the second subset is acoustically coupled to an acoustic transducer of the ANR device in the hear-through mode of operation; and in response to the detection, processing the input signals from the second subset of microphones without using input signals from the particular microphone.

Implementations of the above aspects can include one or more of the following features.

The ANR mode of operation may provide noise cancellation of ambient sound and the hear-though mode of operation provides active hear-through of a portion of the ambient sound. The ANR mode of operation may include feedforward ANR. Processing the first subset of microphones may include using all microphones in the plurality of microphones for generating input signals for the ANR mode of operation. Processing the second subset of microphones may include using all microphones in the plurality of microphones for generating input signals for the hear-through mode of operation.

The first subset of microphones may be the same as the second subset of microphones. The first subset of microphones may be different from the second subset of microphones.

Detecting that a particular microphone of the second subset of microphones is acoustically coupled to the acoustic transducer may include: determining that the magnitude of a tonal signal detected by the particular microphone relative to one or more of other microphones in the second subset satisfies a frequency-dependent threshold condition.

In response to detecting that a particular microphone of the second subset of microphones is acoustically coupled to the acoustic transduce, the controller may be configured to adjust a gain applied to an input signal of another microphone of the second subset of microphones.

The controller is further configured to: process a third subset of microphones from the plurality of microphones to generate input signals for a voice pick-up mode of operation; and execute a beamforming process using the corresponding input signals generated by the microphones of the third subset.

Various implementations described herein may provide one or more of the following advantages. By enabling an ANR device to automatically select different subsets of microphones for use in different modes of operations, the described technology can improve ANR performance without negatively impacting active hear-through mode stability. In particular, when the ANR device is in ANR mode of operation, a controller of the ANR device can select a first subset of feedforward microphones for use in ANR mode to improve the coherence of the ANR device, which in turn can lead to a better ANR performance over existing ANR devices. When the ANR device is in hear-through mode of operation, the controller can select a second subset of microphones for use such that the risk of active hear-through mode instability due to acoustic coupling between microphones and a driver of the ANR device is low. The techniques described herein can potentially improve the performance of an ANR device in both ANR mode and hear-through mode in various environments, particularly in those where the ambient noise can come from different directions and where a user of the ANR device wants to hear a portion of the ambient sounds. For example, an ANR device with the capability to select different subsets of microphones for use in different modes may provide significant advantages when being used in an airplane where the noise comes from different noise sources and where the user wants to listen to flight attendants' announcements.

Two or more of the features described in this disclosure, including those described in this summary section, may be combined to form implementations not specifically described herein. The details of one or more implementations are set forth in the accompanying drawings and the description below. Other features, objects, and advantages will be apparent from the description and drawings, and from the claims.

DETAILED DESCRIPTION

This document describes technology for controlling multiple feedforward microphones in an Active Noise Reduction (ANR) device to improve ANR performance without negatively impacting performance stability in a hear-through mode. An active hear-through mode, which can be also referred to as an "aware mode," is a mode in which the noise reduction function of the ANR device is adjusted, turned down or even switched off for a period of time and at least a part of the ambient sound is allowed to be passed to the user's ears. Examples of acoustic devices with an active hear-through mode can be found in U.S. Pat. Nos. 8,155,334 and 8,798,283, the entire contents of which are incorporated herein by reference.

Figure 2:
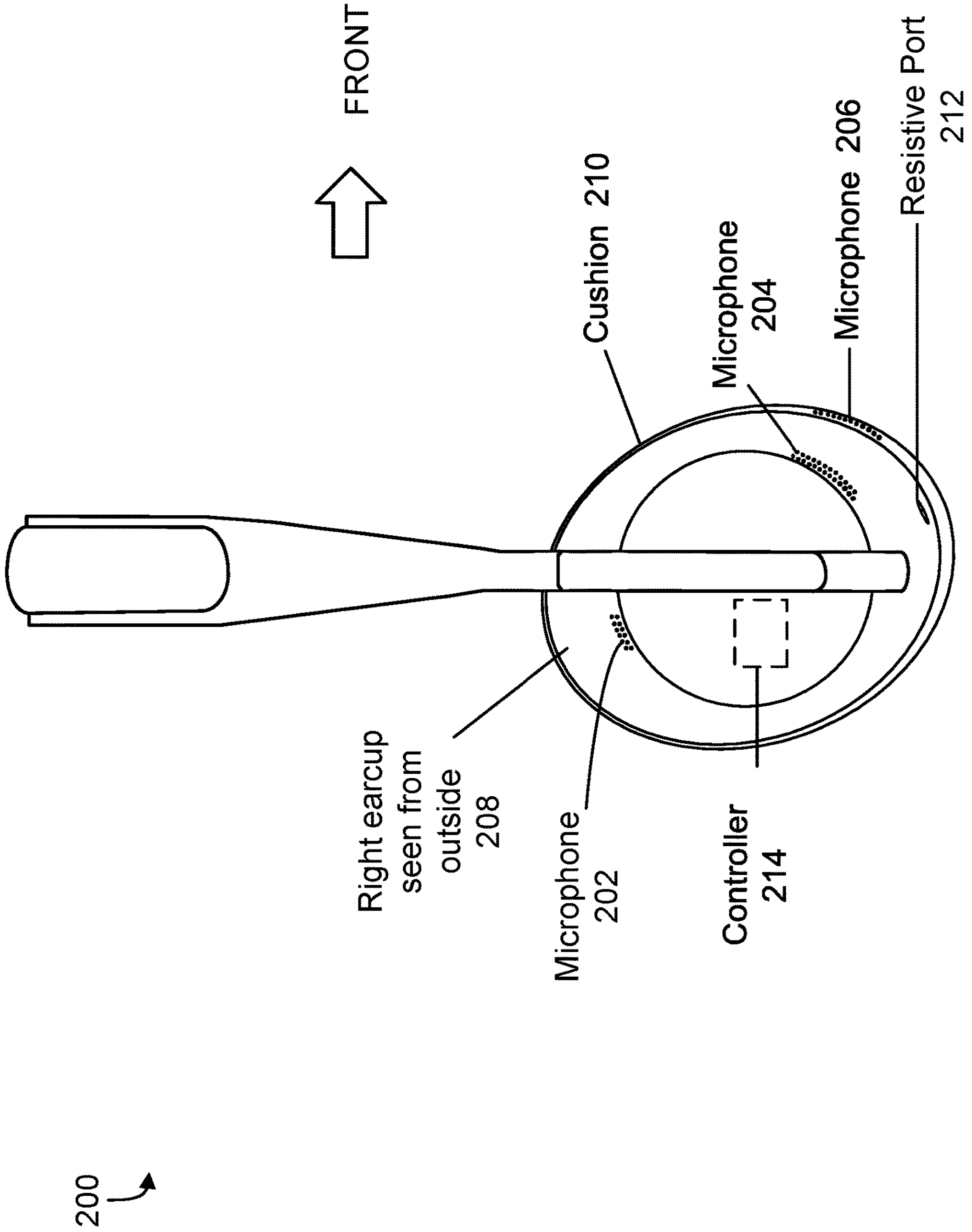
FIG. 2 illustrates an example over-the-ear ANR headphone that has an earpiece with multiple feedforward microphones.

ANR devices such as ANR headphones are used for providing potentially immersive listening experiences by reducing effects of ambient noise and sounds. ANR devices may use feedback noise reduction, feedforward noise reduction, or a combination thereof. Feedforward microphones, as used in this document, refer to microphones that are disposed at an outward-facing portion of the ANR headphone (e.g., on the outside of an earcup 208 of FIG. 2) with a primary purpose of capturing ambient sounds. Examples of a feedforward microphone are shown in FIG. 2, for example, feedforward microphones 202, 204, and 206 disposed on the outside of the earcup 208. Feedback microphones refer to microphones that are disposed proximate to an acoustic transducer of the ANR headphone (e.g., inside an earcup) with a primary purpose of capturing sounds generated by the acoustic transducer.

Adding feedforward microphones to an earcup may lead to a better ANR performance over ANR devices that use only a single feedforward microphone. However, depending on the locations of these feedforward microphones, acoustic coupling between the one or more of the microphones and an acoustic transducer of the ANR device in the active hear-through mode of operation may occur, which negatively impacts the active hear-through mode stability. More specifically, if the acoustic transducer is acoustically coupled to a feed-forward microphone, a positive feedback loop may be unintentionally created, resulting in high-frequency ringing, which may be unpleasant or off-putting to the user. This may happen, for example, if the user cups a hand over an ear when using headphones with a back cavity that is ported or open to the environment, or if the headphones are removed from the head while the active hear-through mode is activated, allowing free-space coupling from the front of the output transducer to the feed-forward microphone.

To improve the ANR performance of the ANR device while mitigating the risk of active hear-through mode instability due to acoustic coupling, the technology described herein allows for the dynamic selection of feedforward microphones for use for each mode of operation. In particular, the technology described herein can allow a controller of the earpiece to process a first subset of microphones from a plurality of feedforward microphones of an earpiece of the ANR device to generate input signals for any ANR mode of operation and process a second subset of microphones to generate input signals for any active hear-through mode of operation. When acoustic coupling is detected between a particular microphone used in the second subset of microphones and the acoustic driver, the controller of the earpiece is configured to exclude that particular microphone from the microphones used to generate input signals for the active hear-through mode of operation. In other words, the controller processes the input signals from the second subset of microphones without using input signals from the particular microphone experiencing acoustic coupling to the acoustic driver. By enabling an ANR device to automatically select appropriate feedforward microphones for use in different modes of operation, the described technology can improve ANR performance without negatively impacting active hear-through mode stability.

Figure 1:
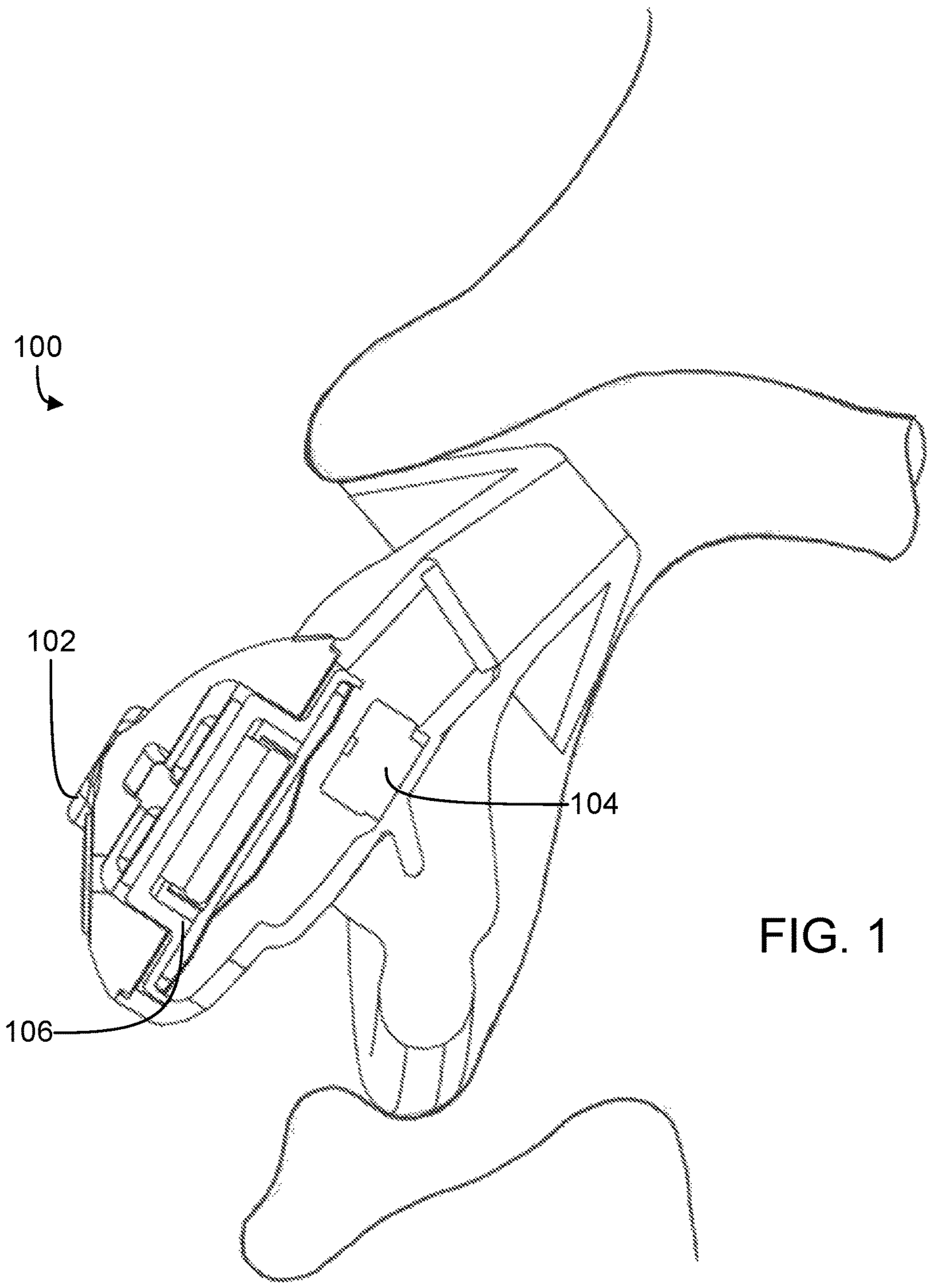
FIG. 1 shows an example of an in-the-ear active noise reduction (ANR) headphone.

Generally, an active noise reduction (ANR) device can include a configurable digital signal processor (DSP), which can be used for implementing various signal flow topologies and filter configurations. Examples of such DSPs are described in U.S. Pat. Nos. 8,073,150 and 8,073,151, which are incorporated herein by reference in their entirety. U.S. Pat. No. 9,082,388, also incorporated herein by reference in its entirety, describes an acoustic implementation of an in-ear active noise reducing (ANR) headphone, as shown in FIG. 1. This headphone 100 includes a feedforward microphone 102, a feedback microphone 104, an output transducer 106 (which may also be referred to as an electroacoustic transducer or acoustic transducer), and a noise reduction circuit (not shown) coupled to both microphones and the output transducer to provide anti-noise signals to the output transducer based on the signals detected at both microphones. An additional input (not shown in FIG. 1) to the circuit provides additional audio signals, such as music or communication signals, for playback over the output transducer 106 independently of the noise reduction signals.

The term headphone, which is interchangeably used herein with the term headset, includes various types of personal acoustic devices such as in-ear, around-ear or over-the-ear headsets, open-ear audio devices, earphones, and hearing aids. The headsets or headphones can include an earbud or ear cup for each ear. The earbuds or ear cups may be physically tethered to each other, for example, by a cord, an over-the-head bridge or headband, or a behind-the-head retaining structure. In some implementations, the earbuds or ear cups of a headphone may be connected to one another via a wireless link.

The performance of ANR devices having multiple feedforward microphones may be improved via strategic placement of the feedforward microphones at locations proximate to noise pathways (pathways through which ambient noise is likely to reach the ear of a user) of the ANR headphone. For example, acoustic leaks between the skin of a user and a headphone cushion that contacts the skin form typical noise pathways during the use of a headphone. Accordingly, one or more of the multiple feedforward microphones can be placed near an outer periphery of a headphone earpiece (for example, near an outer periphery of an over-the-ear headset earcup) and close to the cushion of the earpiece. As another example, ports of an ANR headphone (e.g., a resistive port or a mass port, as described, for example, in U.S. Pat. No. 9,762,990, incorporated herein by reference) can also form noise pathways in headphones. Accordingly, one or more of the multiple feedforward microphones can be disposed near one or more of such ports of the ANR headphone. As described in U.S. Pat. No. 9,762,990, an ANR headphone may have a front cavity and a rear cavity separated by a driver, with a mass port tube connected to the rear cavity to present a reactive acoustic impedance to the rear cavity, in parallel with a resistive port. In some implementations, it may be beneficial to place at least one of the multiple feedforward microphones close to the resistive port or the mass port of the ANR headphone. In some implementations, corresponding microphones may be placed proximate to both the resistive port and the mass port of the ANR device. In some implementations, the positions of the multiple microphones can be distributed around the earpiece so that the multiple microphones may capture noisy signals coming from different directions.

Having a feedforward microphone at a location proximate to a noise pathway is beneficial for ANR performance because the microphone can easily capture one or more input signals representing noise traversing the noise pathway. However, in the active hear-through mode where the microphones capture ambient sounds (that are played back through the driver with a gain of unity or more), a microphone that is placed near a noise pathway is also close to the driver (or acoustic transducer), thus increasing the likelihood of the microphone picking up the output of the driver. Because such coupling can negatively impact the active hear-through mode stability, a microphone that is placed near a noise pathway may not be ideal for use in the active hear-through mode.

The technology described herein implements a controller in an earpiece of an ANR device (e.g., the controller 214 of the ANR device 200 in FIG. 2) such that the controller is capable of automatically processing a respective subset of microphones for each of a plurality of modes of operation in order to improve the ANR performance of the ANR device without negatively impacting the active hear-through mode stability. The controller may include one or more processing devices placed inside an earpiece of the ANR device.

In particular, when the ANR device is in an ANR mode of operation, the controller is configured to process a first subset of microphones from a plurality of microphones of the earpiece to generate input signals for the ANR mode of operation. In some implementations, the first subset can include all of the feedforward microphones of the earpiece. In some other implementations, the plurality of microphones can include one or more microphones that capture signals more representative of the noise through the ANR device and one or more microphones that are farther away from the dominant noise paths. In these other implementations, the first subset can include only the microphones that are more representative of the noise through the device, i.e., through a noise pathway. The noise pathway can be an acoustic path through a port of the earpiece, for example, a mass port or a resistive port of the earpiece (e.g., the resistive port 212 as shown in FIG. 2). The noise pathway can also be an acoustic path formed through a leak between a cushion of the earpiece and the head of a user of the ANR headset earpiece. The noise pathway can also be an acoustic path through a cushion of the earpiece.

When the ANR device is in the active hear-through mode of operation, the controller is configured to process a second subset of microphones from the plurality of microphones to generate input signals for the active hear-through mode of operation. In some implementations, the second subset can include all of the feedforward microphones of the earpiece. In some other implementations, the second subset of microphones may include one or more microphones of the plurality that are located farther away from a noise pathway of the earpiece. The noise pathway in these other implementations refers to an acoustic path between the acoustic transducer and a feedforward microphone. If a microphone is located too close to a noise pathway, there is a risk that the microphone can pick up the output of the driver, causing active hear-through mode instability. To avoid such negative coupling effect, the controller can exclude any such microphones from the second subset of microphones (e.g., by disabling the microphone in the active hear-through mode).

Figure 4:
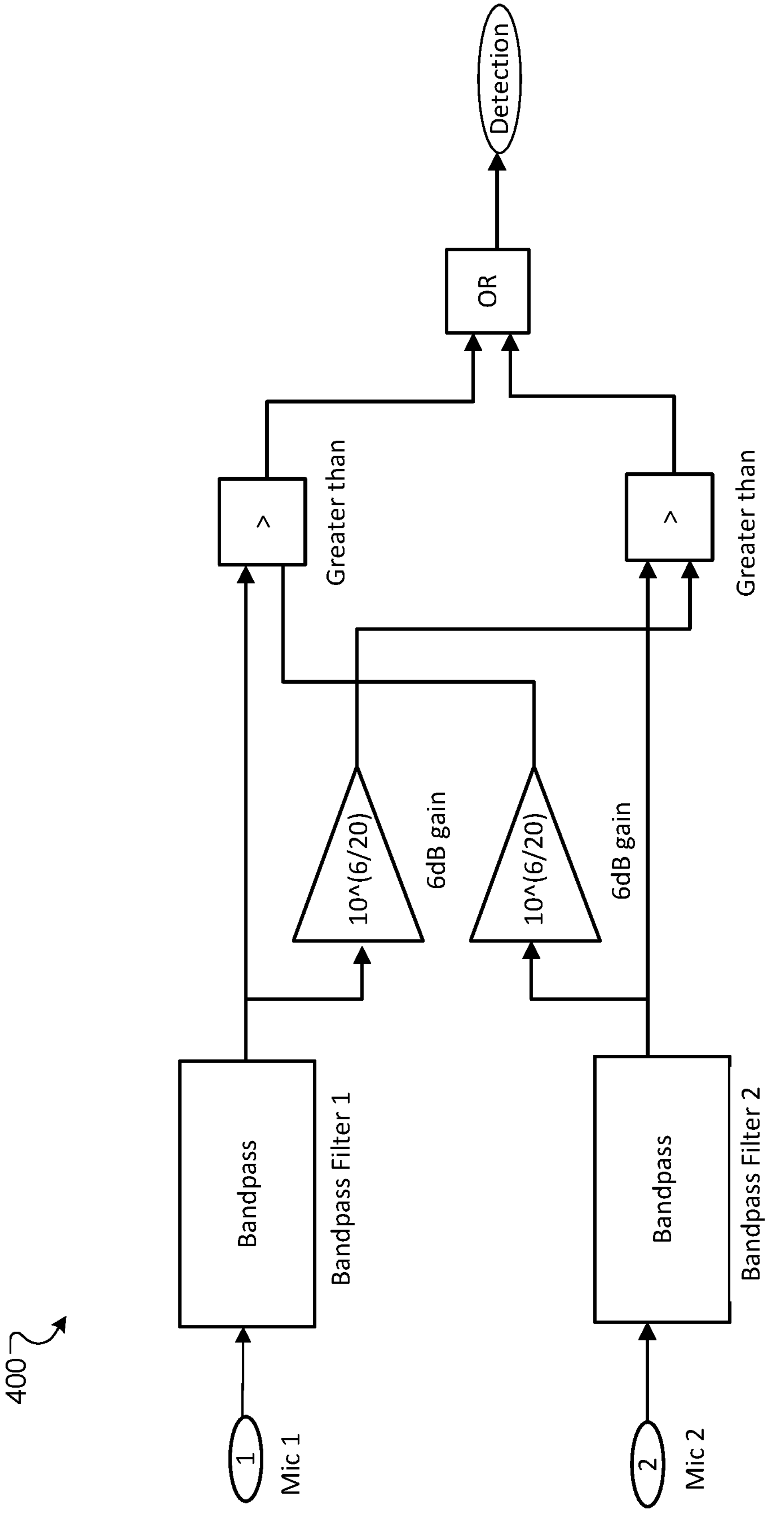
FIG. 4 is a flowchart of an example process for determining whether a particular microphone is acoustically coupled to an acoustic transducer of an ANR device.

In some implementations, when the second subset of microphones is being used for generating input signals for the active hear-through mode of operation, the controller can detect that a particular microphone of the second subset is acoustically coupled to the acoustic transducer. In response to the detection, the controller can exclude the particular microphone from the second subset in generating the input signals for the active hear-through mode of operation. In some implementations, the controller can detect that the particular microphone of the second subset is acoustically coupled to the acoustic transducer by determining that a tonal signal detected by the particular microphone is indicative of an unstable condition. A tonal signal may be a narrowband signal spanning a small frequency range. A tonal signal is indicative of an unstable condition when the magnitude of the tonal signal detected by the particular microphone relative to one or more of other microphones in the second subset satisfies a frequency-dependent threshold condition. For example, the threshold tonal signal can be in a frequency range of a little less than 1 kHz up to several kHz. In implementations where active hear-through mode is used, the tonal signal can be at higher frequencies because in active hear-through mode, more gain are added at higher frequencies. In some other implementations, a different frequency range could be used for a different system with different characteristics Tonal signals can be compared for all microphones in the second subset of microphone to determine the highest tonal signal at a particular microphone. If this highest tonal signal reaches a threshold, coupling between the particular microphone and the acoustic transducer is detected. In other words, a higher magnitude tonal signal is necessarily present when there is acoustic coupling. Considering the relative difference between the tonal signal at each microphone helps distinguish between (i) an externally generated signal which would present on all microphones, and (ii) an internally generated signal due to acoustic coupling with the driver, as the high magnitude tonal signal would not be present on all of the microphones when internally generated. For example, as illustrated by FIG. 4, to compare the tonal signals at microphone 1 (or mic 1) and microphone 2 (or mic 2), the bandpass-filtered energy levels at mic 1 and mic 2 are compared. If the bandpass-filtered energy level in either microphone exceeds that of the other microphone by a threshold, for example 6 dB, a detection of a coupling is outputted. While FIG. 4 shows a threshold of 6 dB, a different threshold can be used.

When coupling between a particular microphone of the second subset and the acoustic transducer is detected, the controller 214 excludes the particular microphone from the microphones used to generate input signals for the active hear-through mode of operation. In some implementations, the controller 214 may then reduce the gain applied to the signal produced by one of the other feedforward microphones of the second subset in response to determining that the particular microphone is producing an unstable condition due to coupling. In some cases, the controller 214 may offset this gain reduction by increasing the gain applied to the signal of another one of the microphones of the second subset. The gain of one or more microphones may be adjusted by a gain factor that is selected by the controller 214 based on the number of microphones present in the ANR headset 200. The controller 214 may adjust the gain factor based on a determination that at least one of the feedforward microphones is causing, or is about to cause, an unstable condition in the system due to coupling by using a variable gain amplifier or other amplification circuitry.

In some implementations, the ANR headset can be operated in a voice pick-up mode, for example, when a user is using the ANR headset to answer a phone call. In these implementations, the controller can automatically select a third subset of microphones of the earpiece for generating input signals for the voice pick-up mode. For example, the third subset of microphones can be selected based on a distance from each of the plurality of microphones to the user's mouth, i.e., only microphones that are close to the user's mouth are selected for voice pick-up. In some cases, the controller selects at least two microphones to include in the third subset, so that the controller can execute a beamforming process using the corresponding input signals generated by the at least two microphones. The beamforming process can be used to combine signals from the two or more microphones to facilitate directional reception. This can be done, for example, using a time-domain beamforming technique such as delay-and-sum beamforming, or a frequency domain technique such as minimum variance distortion less response (MVDR) beamforming.

FIG. 2 illustrates an example over-the-ear ANR headset 200 having an earpiece with multiple feedforward microphones. The earpiece is a right earcup 208 of the headset 200 viewed from outside. The earcup 208 has three microphones 202, 204, and 206 located on the earcup housing (or earcup cover). The microphone 206 is placed towards the front of the earcup 208 and near the periphery of a cushion 210 of the earcup 208. Therefore, during use, the microphone 206 can capture an input signal representing noise traversing an acoustic path formed through the leak between the cushion 210 and the head of the user of the ANR headset 200.

Microphone 202 and microphone 204 are located at approximately diametrically opposite locations on the earcup housing. In particular, the microphone 202 is placed towards the rear of the earcup 208 and the microphone 204 is placed towards the front of the earcup 208 in relation to the location of the microphone 202. The microphones 202 and 204 are both disposed away from the periphery of the cushion 210. While FIG. 2 illustrates three feedforward microphones 202, 204, and 206, in some implementations, a headset can have two feedforward microphones or more than three feedforward microphones. Optionally, the headset can have one or more feedback microphones.

The ANR headset 200 includes a controller 214 that processes a respective subset of microphones for use in each of a plurality of modes of operation (e.g., an ANR mode of operation, an active hear-though mode of operation, and a voice pick-up mode of operation). As shown in FIG. 2, in the active hear-through mode of operation, the controller may be programmed to process microphones 202 and 204 for generating input signals for the active hear-through mode. The microphones 202 and 204 are located farther away from a noise pathway of the earpiece, i.e., an acoustic path between the acoustic transducer and a feedforward microphone. If a microphone is located too close to a noise pathway, there is a risk that the microphone can pick up the output of the driver, causing active hear-through mode instability. In an ANR mode of operation, the controller can be programmed to process all of the three microphones 202, 204, and 206 for use, because the use of multiple feedforward microphones leads to a better ANR performance. In a voice pick-up mode of operation, the controller can be programmed to process only microphones 204 and 206 because they are close to a user's mouth and thus can pick up the user's voice better. In some implementations, upon selecting two or more microphones (e.g., the microphones 204 and 206), the controller can execute a beamforming process to preferentially capture audio from the direction of the user's mouth.

Figure 3:
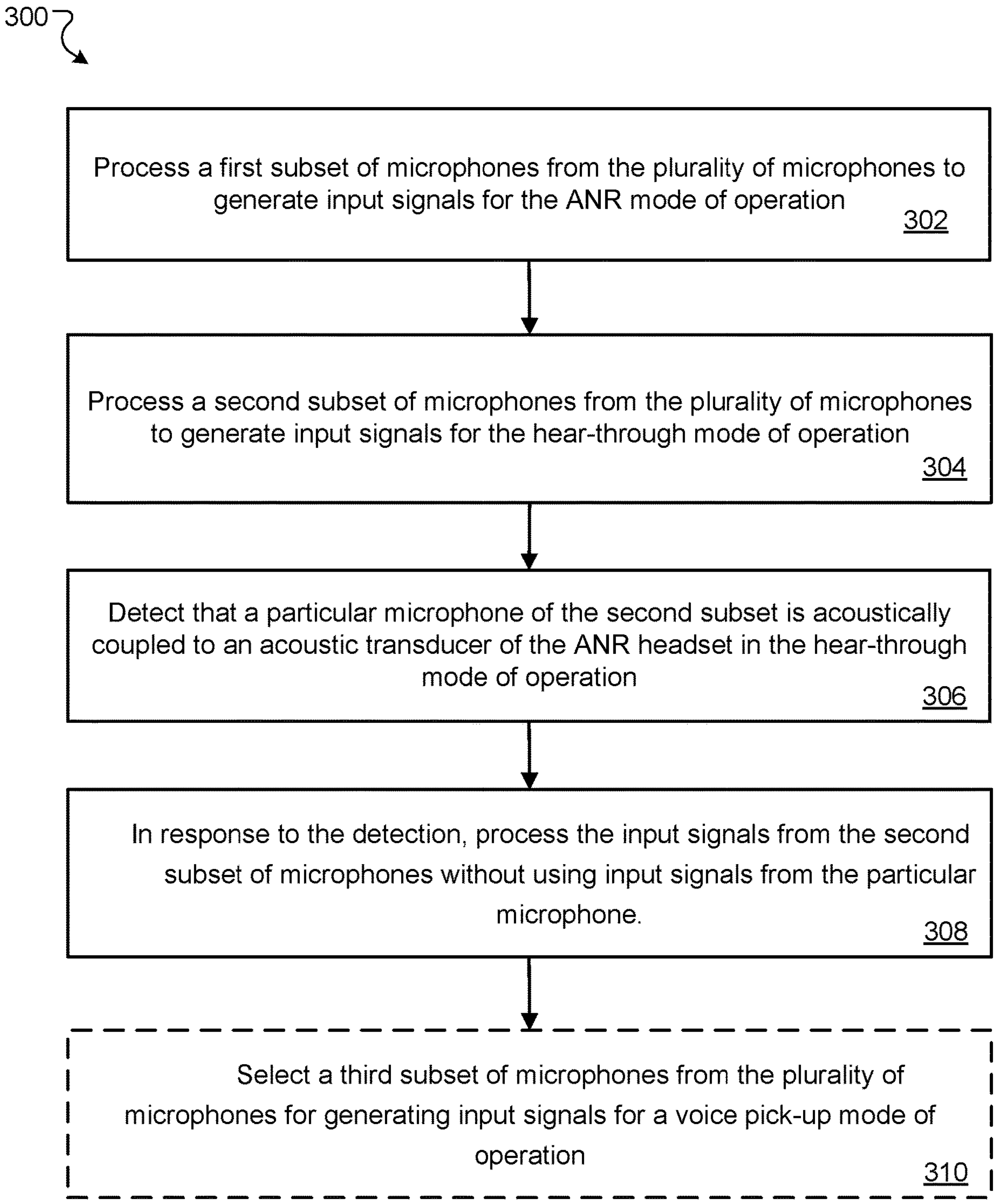
FIG. 3 is a flowchart of an example process for automatically selecting respective subsets of feedforward microphones for use in different modes of operation.

FIG. 3 is a flowchart of an example process 300 for processing respective subsets of feedforward microphones for use in different modes of operation, and dynamically modifying the subset used in an active hear-through mode of operation when a coupling is detected between a microphone in the subset and the acoustic driver. At least a portion of the process 300 can be implemented using one or more processing devices such as DSPs described in U.S. Pat. Nos. 8,073,150 and 8,073,151, incorporated herein by reference in their entirety.

Operations of the process 300 include processing a first subset of microphones from the plurality of microphones to generate input signals for the ANR mode of operation, which provides noise cancellation of ambient sound (302). In some implementations, the ANR device can be an in-ear headphone such as one described with reference to FIG. 1. In some implementations, the ANR device can include, for example, around-the-ear headphones, over-the-ear headphones (e.g., the one described with reference to FIG. 2), open headphones, hearing aids, or other personal acoustic devices. Each of the plurality of microphones is usable for capturing ambient audio to generate input signals for both the ANR mode of operation and the active hear-through mode of operation of the ANR headset. In some implementations, the plurality of microphones are all feedforward microphones. The ANR mode of operation can include feedforward and/or feedback ANR. Processing the first subset of microphones can include using all of the microphones in the plurality of microphones for generating input signals for the ANR mode of operation.

Operations of the process 300 also include processing a second subset of microphones from the plurality of microphones to generate input signals for the hear-through mode of operation (304). The active hear-though mode of operation provides active hear-through of a portion of the ambient sound. Processing the second subset of microphones may include using all microphones in the plurality of microphones for generating input signals for the hear-through mode of operation. In some implementations, the first subset of microphones is the same as the second subset of microphones. In some other implementations, the first subset of microphones is different from the second subset of microphones.

Operations of the process 300 include detecting that a particular microphone of the second subset is acoustically coupled to an acoustic transducer of the ANR headset in the active hear-through mode of operation (306). Detecting that a particular microphone of the second subset of microphones is acoustically coupled to the acoustic transducer may include determining that the magnitude of a tonal signal detected by the particular microphone relative to one or more of other microphones in the second subset satisfies a frequency-dependent threshold condition. A tonal signal may be a narrowband signal spanning a small frequency range. To determine whether there is a coupling between any of microphones in the second subset and the acoustic transducer, the process 300 can include comparing tonal signals at all microphones in the second subset to determine a highest tonal signal. If the highest tonal signal reaches a threshold, coupling between a particular microphone associated with that highest tonal signal and the acoustic transducer is detected.

Operations of the process 300 further include: in response to the detection, processing the input signals from the second subset of microphones without using input signals from the particular microphone (308).

The operations of the process 300 can optionally include processing a third subset of microphones from the plurality of microphones to generate input signals for a voice pick-up mode of operation (310). Selecting the third subset of microphones can include selecting one or more microphones that are close to a user's mouth for voice pick-up. If the third subset of microphones includes at least two microphones, the operations include executing a beamforming process using the input signals generated by the at least two microphones.

While FIGS. 2 and 4 depict particular example arrangements of components for implementing the technology described herein, other components and/or arrangements of components may be used without deviating from the scope of this disclosure. In some implementations, the arrangement of components along a feedforward path can include an analog microphone, an amplifier, an analog to digital converter (ADC), a digital adder (in case of multiple microphones), a VGA, and a feedforward compensator, in that order. In some implementations, the arrangement of components along a feedforward path can include an analog microphone, an analog adder (in case of multiple microphones), an ADC, a VGA, and a feedforward compensator. The arrangement of components can be selected based on target performance parameters. For example, in applications where limiting quantization noise is important, the latter arrangement can be selected because it introduces only a single noise source (an ADC) prior to the gain stage. However this can come at a cost of a dynamic range issue (because of the signals from all microphones passing through a single ADC), which in turn may cause clipping of signals captured by some of the microphones. On the other hand, if avoiding clipping is more important at the cost of potentially more quantization noise, the former arrangement (with an amplifier and an ADC disposed between each microphone 402 and combination circuit 404) may be used.

Figure 5:
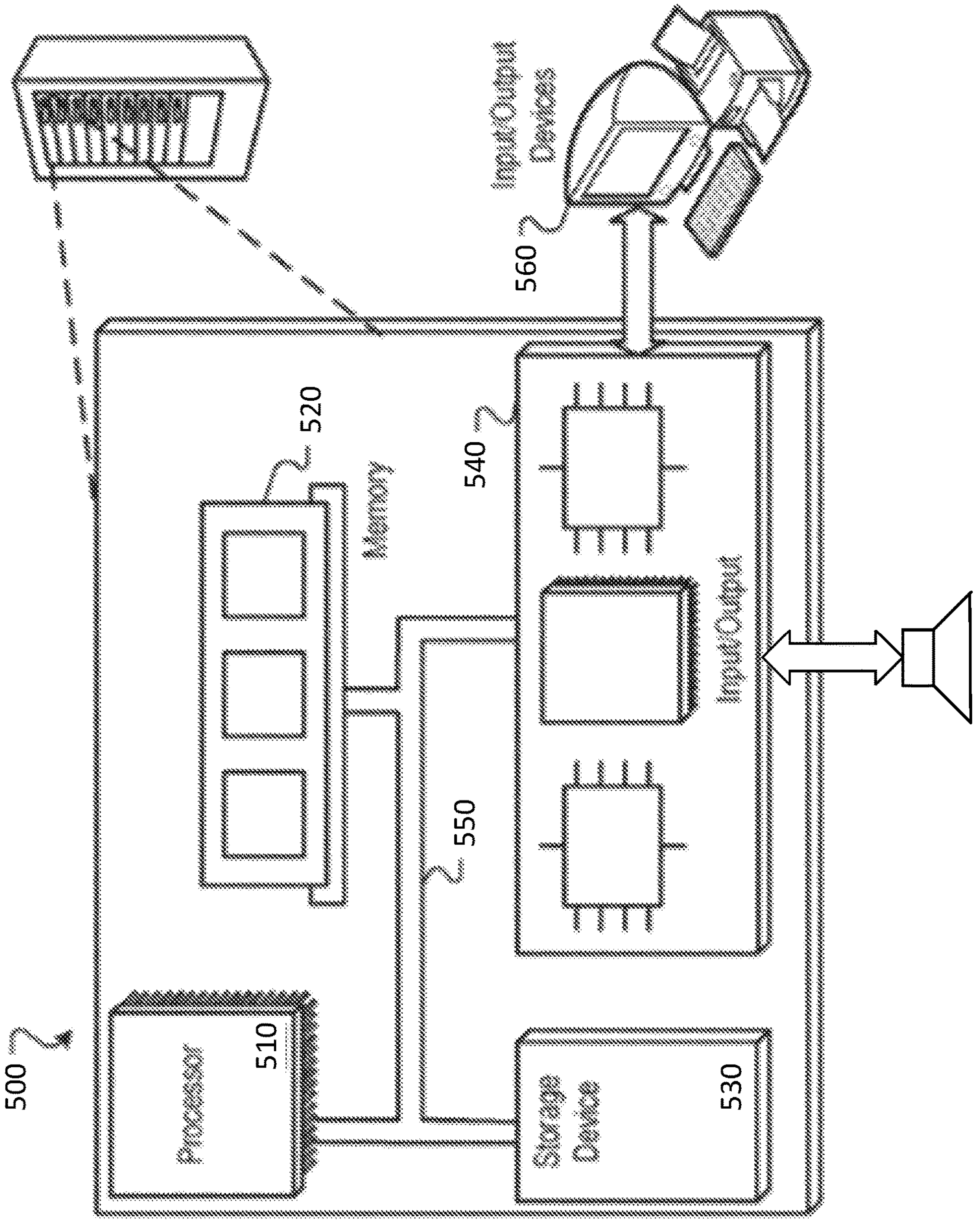
FIG. 5 is a block diagram of an example of a computing device.

FIG. 5 is block diagram of an example computer system 500 that can be used to perform operations described above. For example, any of the systems 100, 200, and 400, as described above with reference to FIGS. 1, 2, and 4, respectively, can be implemented using at least portions of the computer system 500. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560, and acoustic transducers/speakers 570.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

To provide for interaction with a user, embodiments of the subject matter described in this specification can be implemented on a computer having a display device, e.g., a light emitting diode (LED) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

Other embodiments and applications not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. An earpiece of an active noise reduction (ANR) device, the earpiece comprising:

a driver;

a port;

a plurality of microphones, wherein each of the plurality of microphones is usable for capturing ambient audio to generate input signals for both an ANR mode of operation and a hear-through mode of operation of the ANR device; and a controller configured to:

process a first subset of microphones from the plurality of microphones to generate input signals for the ANR mode of operation, and process a second subset of microphones from the plurality of microphones to generate input signals for the hear-through mode of operation, wherein the second subset of microphones excludes a first microphone from the plurality of microphones located closest to a noise pathway of the earpiece, wherein the first microphone is positioned close enough to the port to cause coupling between the first microphone and the driver.

2. The earpiece of claim 1, wherein the second subset of microphones includes all the microphones of the plurality of microphones except for the first microphone located closest to the noise pathway of the earpiece.

3. The earpiece of claim 1, wherein the first subset of microphones includes all the microphones of the second subset of microphones.

4. The earpiece of claim 1, wherein the controller is further configured to:

process a third subset of microphones from the plurality of microphones to generate input signals for a voice pick-up mode of operation, wherein the third subset of microphones excludes a second microphone from the plurality of microphones located farthest away from a user's mouth when the earpiece is worn.

5. The earpiece of claim 4, wherein the third subset of microphones includes all the microphones of the plurality of microphones except for the second microphone located farthest away from the user's mouth when the device is worn.

6. The earpiece of claim 4, wherein the first subset of microphones includes all the microphones of the third subset of microphones.

7. The earpiece of claim 4, wherein the controller is further configured to:

execute a beamforming process using the corresponding input signals generated by the microphones of the third subset of microphones.

8. The earpiece of claim 1, wherein the ANR mode of operation provides noise cancellation of ambient sound and the hear-though mode of operation provides active hear-through of a portion of the ambient sound.

9. The earpiece of claim 1, wherein the ANR mode of operation comprises feedforward ANR.

10. The earpiece of claim 1, wherein processing the first subset of microphones comprises using all microphones in the plurality of microphones for generating input signals for the ANR mode of operation.

11. The earpiece of claim 10, wherein processing the second subset of microphones comprises using all microphones in the plurality of microphones for generating input signals for the hear-through mode of operation except for the first microphone located closest to the noise pathway of the earpiece.

12. A computer-implemented method comprising:

processing, from a plurality of microphones disposed on an earpiece of an ANR device, a first subset of microphones to generate input signals for an ANR mode of operation; and processing a second subset of microphones from the plurality of microphones to generate input signals for a hear-through mode of operation, wherein each of the plurality of microphones is usable for capturing ambient audio to generate input signals for both the ANR mode of operation and the hear-through mode of operation of the ANR device, wherein the second subset of microphones excludes a first microphone from the plurality of microphones located closest to a noise pathway of the earpiece, and wherein the earpiece comprises a driver and a port, and the first microphone is positioned close enough to the port to cause coupling between the first microphone and the driver.

13. The method of claim 12, wherein the ANR mode of operation provides noise cancellation of ambient sound and the hear-though mode of operation provides active hear-through of a portion of the ambient sound.

14. The method of claim 12, wherein processing the first subset of microphones comprises using all microphones in the plurality of microphones for generating input signals for the ANR mode of operation.

15. The method of claim 12, wherein processing the second subset of microphones comprises using all microphones in the plurality of microphones, except for the first microphone located closest to a noise pathway of the earpiece, for generating input signals for the hear-through mode of operation.

16. The method of claim 12, further comprising:

processing a third subset of microphones from the plurality of microphones to generate input signals for a voice pick-up mode of operation; and executing a beamforming process using the corresponding input signals generated by the microphones of the third subset.

17. The method of claim 16, wherein the third subset of microphones excludes a second microphone from the plurality of microphones located farthest away from a user's mouth when the earpiece is worn.

* * * * *